S. MILBURY & G. A. KING.

Horseshoes for Marshy Grounds.

No. 147,342. Patented Feb. 10, 1874.

Inventor.
Samuel Milbury
George A. King

Attest
J. C. Fuck
H. G. Milligan

UNITED STATES PATENT OFFICE.

SAMUEL MILBURY AND GEORGE A. KING, OF OAKLAND, CALIFORNIA.

IMPROVEMENT IN HORSESHOES FOR MARSHY GROUND.

Specification forming part of Letters Patent No. 147,342, dated February 10, 1874; application filed December 16, 1873.

*To all whom it may concern:*

Be it known that we, SAMUEL MILBURY and GEORGE A. KING, both of Oakland, in the county of Alameda and State of California, have invented a Horseshoe, of which the following is a specification:

The object of our invention is to secure the feet of horses from sinking into marsh or tule ground and still retain the natural bearing and motion of the foot in walking upon dry ground.

The nature of our invention will be more fully understood by reference to the accompanying drawing and description.

Figure 1:
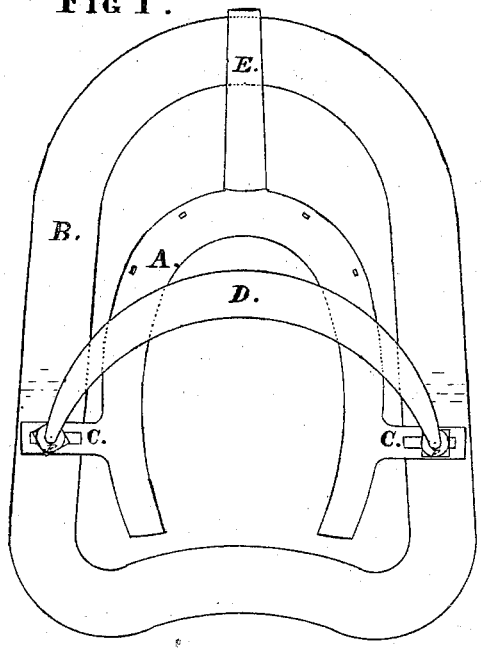
Figure 2:
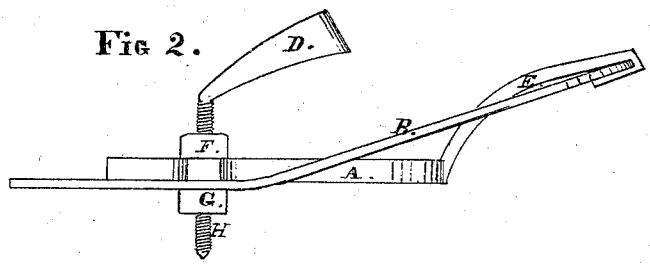

Figure 1 is a plan view, and Fig. 2 is a side elevation.

A is a horseshoe, having the slotted projections C and the connecting-bar E. The hoof-band D is attached through the slotted projections C, and is adjustable through the same to allow the contraction and expansion of the shoe to suit the hoof. It is also adjustable by means of the nuts F and G operating upon the screws H, for the purpose of adjusting the band D to the hoof. The encircling plate B is attached at the projections C and the connecting-bar E.

The following is the construction and operation of the shoe: The shoe A is fitted to the hoof of the horse, then the plate B is placed in the hook of the connecting-bar E, and brought up to a firm bearing, and firmly attached to the slotted projections C by means of the nuts F and G; at the same time the band D is brought down tightly upon the hoof and secured by the nuts F and G. The connecting-bar E is brought nearly straight up at the toe, and curved over to the point of attachment to the outer plate B in order to allow the motion of the foot in walking to be natural and easy.

I do not claim the use of a band over the hoof, or an encircling plate to receive the weight of the horse, as they have been used before; but

What I claim is—

The combination of the shoe A, provided with slotted projections C, with encircling plate B, for the purpose of allowing the contraction and expansion of the shoe to suit the hoof and to form a central bearing for the foot upon the plate B, substantially as set forth.

SAMUEL MILBURY.
GEORGE A. KING.

Witnesses:
J. C. TUCK,
H. G. MILLIGAN.